Sept. 16, 1958  H. W. HEIDERGOTT  2,852,123
FEEDING DEVICES
Filed Jan. 18, 1956
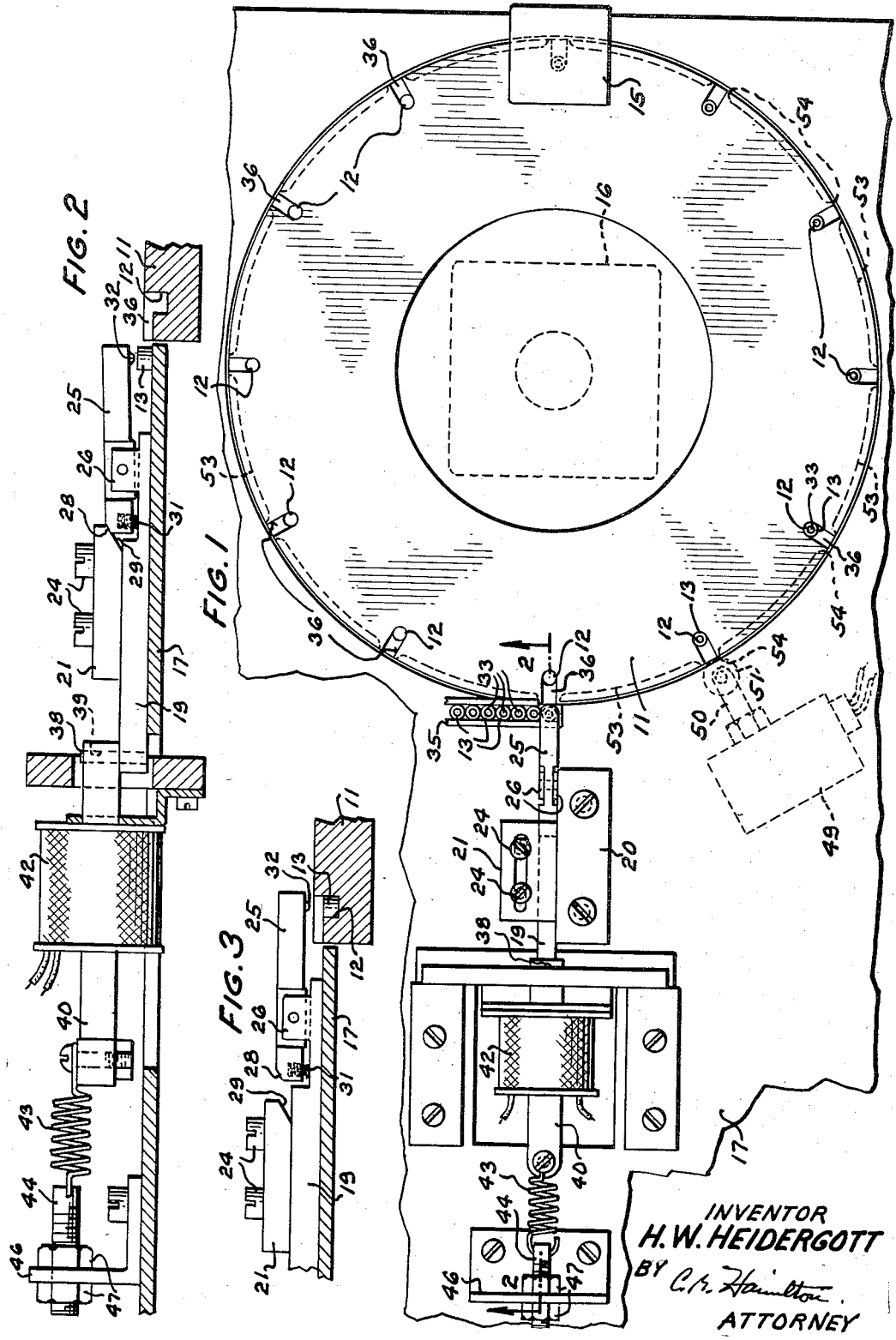
INVENTOR
H. W. HEIDERGOTT
BY C.R. Hamilton
ATTORNEY

United States Patent Office 2,852,123
Patented Sept. 16, 1958

2,852,123
FEEDING DEVICES

Harry W. Heidergott, Indianapolis, Ind., assignor to Western Electric Company, Incorporated, New York, N. Y., a corporation of New York Application January 18, 1956, Serial No. 559,895

6 Claims. (Cl. 198—24)

This invention relates to feeding devices and more particularly to devices for feeding articles onto a work feed table.

An object of this invention is to provide a device for feeding articles onto work feed tables.

A further object of this invention is to provide a device for feeding articles from a supply into recesses in an indexing table and for returning the article to the supply if the recess is already occupied by an article.

One embodiment of the present invention may include an indexing table having recesses for receiving articles and carrying them past a work station. Articles are fed one by one into position under a raised end of a reciprocable feed member in retracted position. When the reciprocable feed member is moved toward the indexing table, its raised end is lowered to engage one of the articles and move it into position over one of the recesses in the table. If the recess is empty the article drops into it, free from the feed member. If, however, the recess is already occupied by an article, the feed member returns the article and then moves it into the next recess in the table which is indexed into the desired alignment with the feed member.

Other objects and advantages of the invention will become apparent by reference to the following detailed description and the accompanying drawing illustrating a preferred embodiment of the invention, in which:

Fig. 1 is a plan view of the device showing a control switch closed to energize a solenoid to actuate the feed mechanism but with the feed mechanism still in unactuated, retracted position;

Fig. 2 is an enlarged, fragmentary, cross-sectional view taken on line 2—2 of Fig. 1 showing the feed member in retracted position with one end raised to permit a bushing to be fed to move thereunder; and Fig. 3 is a fragmentary view of the disclosure of Fig. 2 showing the feed member at the end of the feed stroke.

Referring now in detail to the drawing, an indexable table 11 is mounted above and driven by an indexing mechanism 16 (Fig. 1) of a well-known type. The table 11 is provided with spaced recesses 12 for receiving apertured bushings 13 to be fabricated at a work station 15, the bushings 13 being sequentially moved by the table 11 into position at the work station 15 where they are fabricated and ejected from the recesses 12. A base 17 supports a reciprocable bar 19 mounted between a plate 20 secured to the base 17 and a guide member 21 adjustably secured to the base 17 by bolts 24 and having a portion extending over the bar 19.

A feed member 25 pivotally mounted between two uprights 26 of the bar 19 is provided with an inclined surface 28 (Figs. 2 and 3) for engaging a cam surface 29 on the guide member 21 when the bar 19 is moved to the left (Figs. 1 and 2) into retracted position whereby the feed member 25 is pivoted counterclockwise and its right end is raised as shown in Fig. 2. A compression spring 31 mounted between the feed member 25 and the bar 19 normally urges the feed member 25 in a clockwise direction (Figs. 2 and 3).

The right end of the feed member 25 is provided with a depending lug 32 (Figs. 2 and 3) for entering an aperture 33 in the bushing 13 to move it along the base 17 as the feed member 25 is moved, the lug 32 entering the aperture 33 in the bushing 13 when the surface 28 on the feed member 25 clears the cam surface 29 on the guide member 21. An inclined chute 35 (Fig. 1) containing a supply of bushings 13 feeds them one by one into position under the raised end of the feed member 25. During the feed stroke the bar 19 retains the remaining bushings 13 in the chute 35. The bushings 13 are moved one by one across the base 17 and through slots 36 in the table 11 into position over the recesses 12 into which they drop if other bushings 13 are not already occupying the recess 12. If one of the recesses 12 is occupied by another bushing 13, the bushing in engagement with the feed member 25 does not drop into the recess 12 but is moved with the feed member 25 back into retracted, ready-to-feed position.

A pin 38 secured to the bar 19 extends into an aperture 39 (Fig. 2) in an armature 40 of a solenoid 42 mounted on the base 17 whereby the bar 19 is moved when the solenoid 42 is energized. A tension spring 43 is secured at one end to the armature 40 for moving it to move the bar 19 to the left (Figs. 1 and 2) into retracted position and its other end is secured to a threaded element 44 passing through a bracket 46 secured to the base 17. Nuts 47 threaded onto the element 44 are provided for adjusting the tension of the spring 43.

A control switch 49 (Fig. 1) is mounted beneath the base 17 and is provided with an actuating plunger 50 carrying a roller 51. The roller 51 engages a surface 53 of the table 11 and is displaced to actuate the switch 49 by projecting cam portions 54 on the surface 53, the switch 49 being of a well-known type which remains closed only temporarily when actuated. The switch 49 is electrically connected to the solenoid 42 whereby when the table 11 is indexed to move a slot 36 and companion recess 12 into alignment with the feed member 25, one of the came portions 54 on the surface 53 moves the roller 51 and plunger 50 to close the control switch 49, whereupon the solenoid 42 is actuated to move the bar 19 to feed one of the bushings 13 into the recess 12 aligned with the feed member 25.

If it is desirable an air cylinder and a solenoid valve (not shown) can be substituted for the solenoid 42. The control switch 49 would actuate the solenoid valve to operate the air cylinder for feeding the bushings 13 and the tension spring 43 would retract the bar 19 and the feed member 25 after the feed stroke.

In operation of the device, the table 11 is actuated by the indexing mechanism 16 (Fig. 1) whereby the recesses 12 in the table 11 are sequentially moved into alignment with the feed member 25. One of the projecting cam portions 54 on the surface 53 engages the roller 51 on the plunger 50 and moves the roller and the plunger to actuate the switch 49 when the table 11 stops with one of its recesses 12 in alignment with the feed member 25. When the switch 49 closes, the solenoid 42 is energized to move the armature 40 to the right, the solenoid 42 being normally deenergized and the armature 40, bar 19 and feed member 25 being held in retracted positions (Figs. 1 and 2) by the tension spring 43. When the surface 28 on the feed member 25 clears the cam surface 29 on the guide member 21 the spring 31 pivots it clockwise whereby the lug 32 enters the aperture 33 in the bushing 13 in feed position.

The bushing 13 is moved across the base 17 and through one of the slots 36 in the table 11 until it is in position over the recess 12. If the recess 12 is empty the bushing 13 drops into it, free from the lug 32 on the feed member 25. If, however, the recess 12 is occupied by another bushing 13, the bushing in engagement with the feed member 25 is carried back into feed position with the feed member 25. This bushing 13 is then advanced by the feed member 25 when the solenoid 42 is again actuated, this procedure being repeated until the bushing drops into an empty recess 12. After the feed member 25 has reached the end of its feed stroke the switch 49 opens to deenergize the solenoid 42 and the spring 43 returns the armature 40, bar 19 and feed member 25 to retracted position as shown in Figs. 1 and 2. As the feed member 25 nears the end of the return stroke its surface 28 engages the cam surface 29 on the guide member 21 and the right end (Fig. 2) of the feed member 25 is raised to permit one of the bushings 13 to move from the chute 35 into position under the lug 32 on the feed member 25. This procedure is repeated when the table is again indexed and the solenoid 43 is actuated by the closing of the switch 49. The bushings 13 in the recesses 12 are carried past the work station 15 where they are fabricated and ejected from the recesses 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for feeding articles, comprising a base having a surface along which articles are to be advanced, a reciprocable member on the base, means for reciprocating the member in advance and retract strokes, feed means carried by and movable on said reciprocable member for engaging one of the articles to move it beyond the edge of the base on the advance stroke, means for holding the feed means out of article engaging position as the retract stroke ends and the advance stroke begins, means for allowing one of the articles to move into position to be engaged by the feed means, and means for moving the feed means into article engaging position and holding it in said position during the end of the feed stroke and the beginning of the retract stroke.

2. In a device for feeding articles, a base, a member reciprocable on the base, means for reciprocating said member in advance and retract strokes, feed means carried on the member for engaging an article to move it beyond the edge of the base on the advance stroke, an element secured to the base and having a surface for engaging the feed means to elevate it when it is retracted, means for allowing one of the articles to move into position beneath the elevated feed means, and resilient means for lowering the feed means and holding it in lowered position until it is elevated by the element at the end of the retract stroke.

3. A device for feeding articles, comprising a base, a rotatable table having recesses for receiving articles to be fabricated, means for intermittently moving said table, a reciprocable bar mounted on the base in alignment with one of the recesses in the rotatable table, means mounted on the base for advancing and retracting the reciprocable bar, a feed member pivotally secured to the reciprocable bar for engaging one of the articles to advance it along a predetermined path into one of the recesses in the table, an element secured to the base for engaging the feed element to pivot it out of said path when it is retracted, means for allowing an article to move into the path in position to be engaged by the feed member when it is advanced, and means for pivoting said feed member back into the path when it is advanced whereby it engages the article to move it along the path, said feed member remaining in the path as it is retracted for withdrawing the article to a retracted position if the recess in the table is occupied by another article.

4. In an article feed device, a base, a movable table positioned adjacent to the base and having recesses for receiving articles to be fabricated, means for intermittently moving the table, a reciprocable bar mounted on the base, means responsive to the position of the table for advancing the bar toward said table, means for retracting the bar from its advanced position, a feed member pivotally secured to the bar, means mounted on the base for elevating the feed member when the bar is retracted, means mounted on the base for allowing an article to move into position beneath the raised feed member, and means mounted between the bar and the feed member for lowering said feed member to engage the article positioned thereunder when the bar is advanced whereby the feed member moves the article into position over the recess in the table, said feed member remaining lowered as it is retracted for returning the article to retracted position if said recess is occupied by another article.

5. In a device for feeding articles, a base, a movable table positioned adjacent to the base and having recesses for receiving articles to be fabricated, a movable bar supported on the base, a solenoid mounted on the base and having an armature, said armature being attached to the bar whereby the bar is advanced when the solenoid is energized, a spring secured to the armature and the base for retracting the armature and the bar, means for energizing the solenoid to advance the bar when one of the recesses is in alignment with said bar, a feed member pivotally mounted on the bar for engaging an article to advance it, an element secured to the base and having a cam surface for engaging the feed member to raise it above the path as it nears its retracted position, means for allowing one of the articles to move into position beneath the raised feed member in retracted position, and means for lowering the feed member when the bar is advanced whereby said feed member engages the article positioned therebelow to advance it into position above the recess in the movable table, said article dropping into the recess if it is unoccupied by another article, said feed member remaining lowered as it begins to move toward its retracted position for retracting the article if the recess is occupied by another article.

6. A device for feeding work parts, comprising a base, article transfer means adjacent to and lower than the base, a member reciprocably mounted on the base, means on the base for reciprocating said member in advance and retract strokes, a feed member pivotally carried by the member for engaging an article to move it along the base and into a position above the transfer means, means for engaging the feed member to hold it in an elevated position during the end of the retract stroke and the beginning of the advance stroke, means for allowing an article to move into position beneath the feed member at the end of the retract stroke, and spring means on the member for holding the feed member in a lowered position during the end of the feed stroke and the beginning of the retract stroke whereby an advanced article is withdrawn on the retract stroke if another article on the transfer means prevents said advanced article from dropping onto said transfer means.

References Cited in the file of this patent

UNITED STATES PATENTS

| 2,011,536 | Cave | Aug. 13, 1935 |
| 2,612,255 | Leuschner | Sept. 30, 1952 |
| 2,652,137 | Taranto | Sept. 15, 1953 |